Feb. 14, 1967      R. L. DARDELET      3,303,991
GAS PUMPS AND COMPRESSORS OF THE LIQUID RING TYPE
Filed Dec. 23, 1964      4 Sheets-Sheet 1
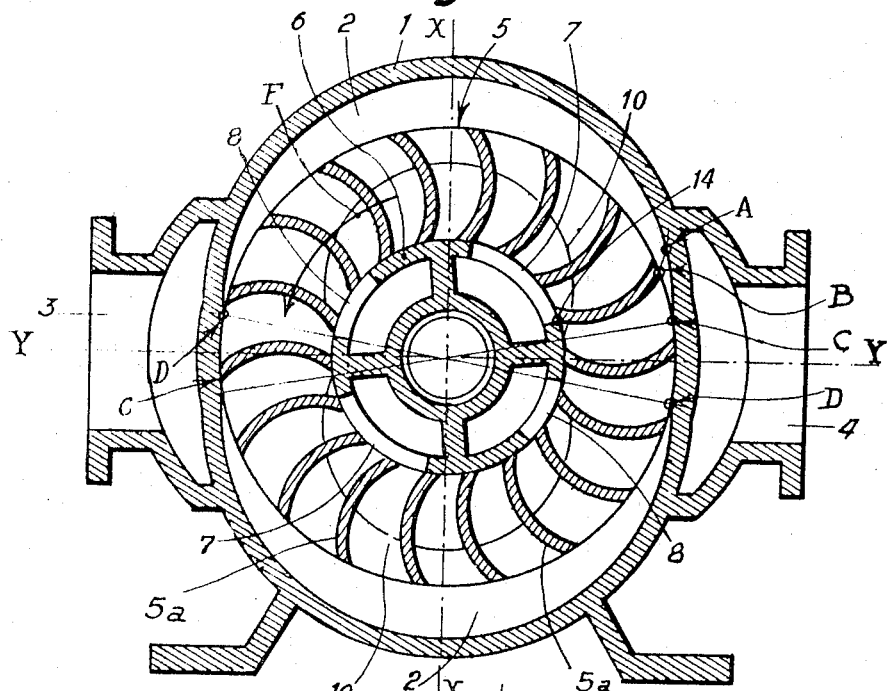
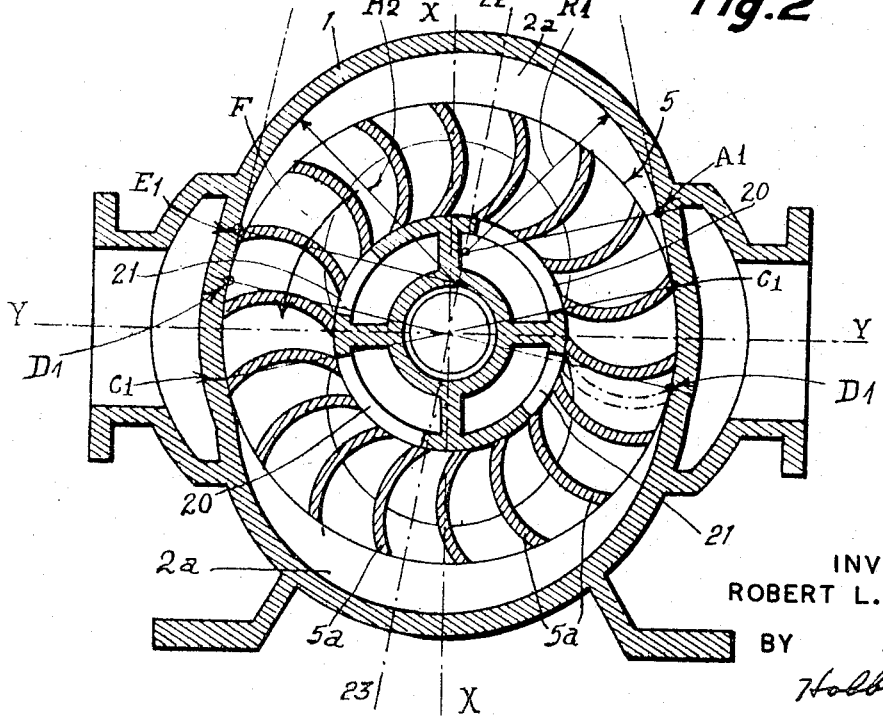
INVENTOR
ROBERT L. DARDELET
BY
Hobbs & Easton
ATTORNEYS Feb. 14, 1967 R. L. DARDELET 3,303,991
GAS PUMPS AND COMPRESSORS OF THE LIQUID RING TYPE
Filed Dec. 23, 1964 4 Sheets-Sheet 2

INVENTOR
ROBERT L. DARDELET

BY Hobbs & Easton

ATTORNEYS

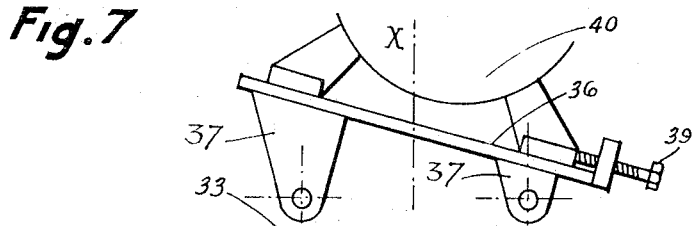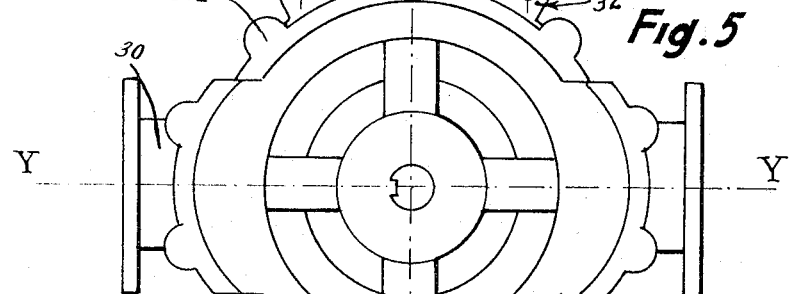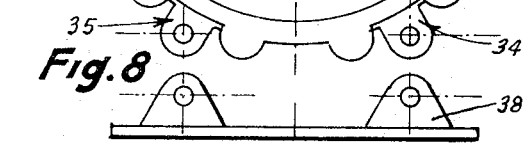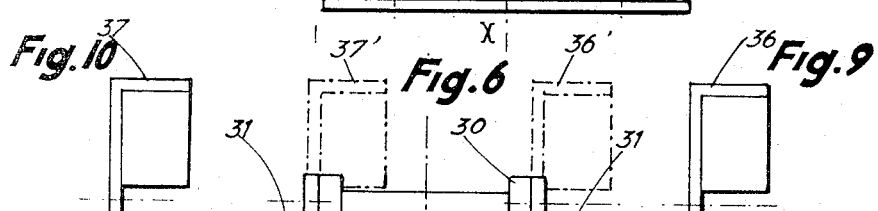

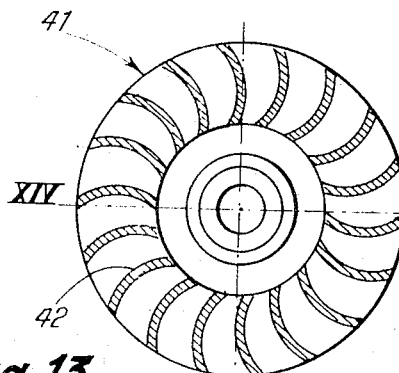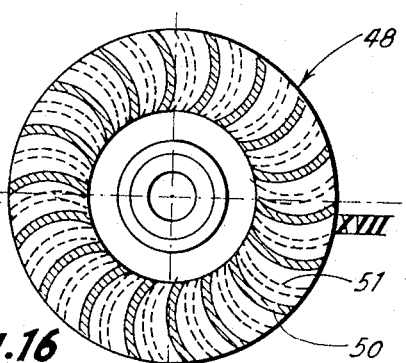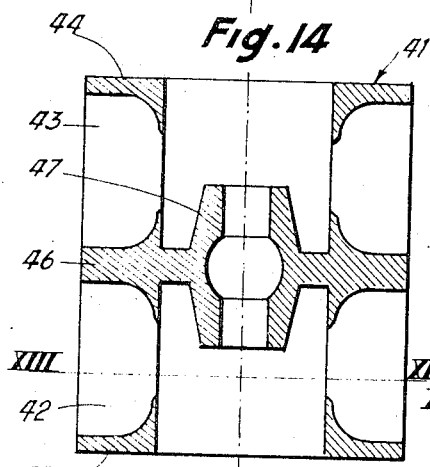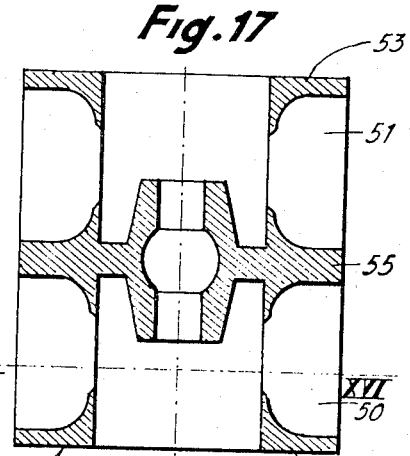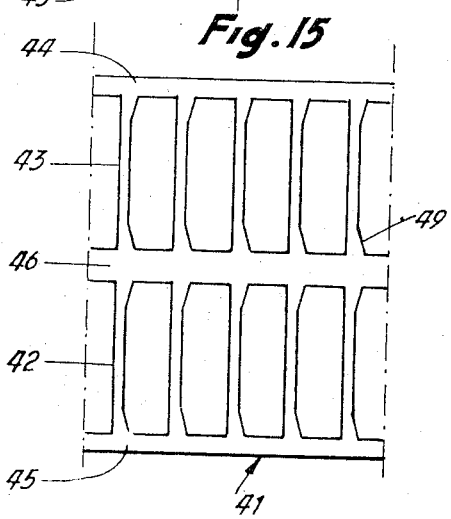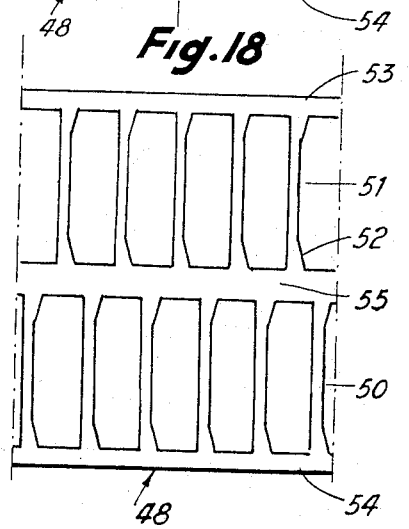

United States Patent Office 3,303,991
Patented Feb. 14, 1967

3,303,991
GAS PUMPS AND COMPRESSORS OF THE LIQUID RING TYPE
Robert Léon Dardelet, La Detourbe, Meylan, France
Filed Dec. 23, 1964, Ser. No. 420,688
Claims priority, application France, Jan. 2, 1964, 959,129, Patent 1,388,967
4 Claims. (Cl. 230—79)

The present invention relates to gas pumps and compressors of the liquid ring type and is directed to improvements in machines of this class, said improvements being intended to simplify the constructional design and increase the efficiency of said machines.

A first improvement is intended to overcome the disadvantage which arises from the fact that the liquid of the liquid ring has a tendency to escape from the compartments between the vanes before the suction and discharge ports have been uncovered by the root or heel of a rotor vane which, as will be explained hereinafter, results in the impact of liquid droplets on the stator and rotor and thus causes considerable erosion of these members.

The first improvement referred-to accordingly lies in the fact that the walls of the eccentric lobes of the working chamber of the stator are joined tangentially or almost tangentially to the centered portions of cylindrical wall of said working chamber.

According to a development of the above improvement, the diametral plane of the working chamber assembly which comprises the above-mentioned concentric lobes passes through the centers of curvature of the said lobes and is inclined towards the rear (when considering the direction of rotation of the rotor) with respect to the diametral plane of symmetry of the centered cylindrical surfaces of the working chamber of the stator, the angle of inclination referred-to being preferably comprised between 5 and 15°.

To overcome the disadvantage which, in the known machines, results from the presence, at the points of junction between the stator, on the one hand, and the lugs for fixing the pump on its support (floor or baseplate) and (or) the lugs for fixing the motor on the pump, on the other hand, of masses of metal when said lugs are cast in one piece with the pump casing.

The lugs referred-to above are made up of separate members which are added on the pump casing and the fixing faces of said lugs coincide with the faces on which the end-plates of the stator are fixed to the pump casing.

Further, to overcome the disadvantage which arises from the production of internal stresses within the vanes and from the formation of cracks in the case of a rotor having several rings of vanes, another improvement consists in angularly displacing the different rings of vanes relatively to each other; the angle of displacement being preferably equal to the pitch of the blades in each ring divided by the number of said rings.

Further particular features and characteristics of the invention will be brought out by the following description of examples which relate to the practical application of the improvements according to the invention and which are given without any limitation being implied, said examples being illustrated diagrammatically in the accompanying drawings, in which:

FIG. 1 is a view in transverse cross-section of a liquid-ring pump of known type;

FIG. 2 is a view which is similar to FIG. 1, showing another pump of known type according to the invention;

FIG. 5 is a view in elevation of a pump casing which is adapted to receive added fixing lugs;

FIG. 6 is a view taken at right angles to FIG. 5;

FIG. 7 is a view in elevation of a cradle element of the motor provided with one pair of fixing lugs for the purpose of mounting said motor on the pump of FIGS. 5 and 6;

FIG. 8 is a profile view of two lugs for supporting the pump;

FIGS. 9 and 10 are end views of the cradle elements of the motor;

FIGS. 11 and 12 are end views of the pairs of lugs for supporting the pump;

FIG. 13 is a view in transverse cross-section taken along the line XIII—XIII of FIG. 14 of a conventional pump rotor with two vane rings;

FIG. 14 is a view in diametral cross-section taken along the diametral plane XIV—XIV of FIG. 13;

FIG. 15 is a partial developed view of the two vane rings of the rotor of FIGS. 13 and 14;

FIG. 16 is a view in transverse cross-section taken along the line XVI—XVI of FIG. 17 of a rotor with two vane rings, of improved design according to the invention;

FIG. 17 is a view in cross-section taken along the diametral plane VXII—XVII of FIG. 16;

Figure 3:
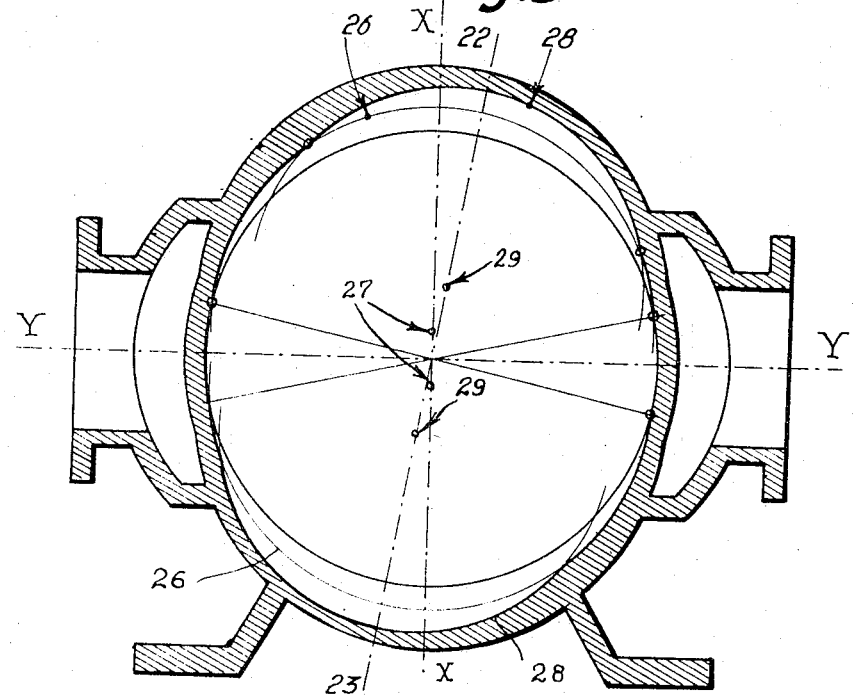
FIG. 3 is a view in transverse cross-section of an improved pump stator which can be constructed with ordinary tooling equipment.

Finally, FIG. 18 is a partial developed view of both vane rings of the rotor of FIGS. 16 and 17.

The liquid-ring gas pump of known type which has been illustrated in FIG. 1 comprises a pump casing 1, a working chamber or so-called impeller chamber being formed within said casing and consisting of a central zone which is centered on the axis of the pump and two eccentric lobes which are in diametrically opposite relation (so as to balance the stresses exerted on the rotor 5) relatively to the plane of symmetry Y—Y of the two centered cylindrical portions of surface of said chamber.

Each of the lobes 2 is delimited by a cylindrical portion of wall having the same radius and the machining of which is conveniently carried out on a lathe either of the horizontal or vertical type without requiring complicated tooling equipment. The pump casing 1 is provided in accordance with customary practice with a suction pipe 3 and a discharge pipe 4 having a common axis which is usually contained in the diametral plane Y—Y.

There is mounted, within the pump casing 1, the rotor 5 which is designed to rotate on a centered stationary distributor 6 provided with suction ports 7 and discharge ports 8 which communicate respectively with the suction pipe 3 and discharge pipe 4 through either one or both end-plates (not shown in FIG. 1) which are applied against the above-mentioned pump casing and distributor.

When the working chamber or impeller chamber is supplied with liquid and the rotor 5 accordingly rotates in the direction of the arrow F, there is formed within said impeller chamber a liquid ring which is forced against the internal walls of said chamber, that is to say against the two eccentric lobes 2. Said liquid ring is limited on the inside by a surface 10, the elements of which constitute together with the vanes 5a chambers of alternately variable volume which increases by sucking-in gas through the ports 7 and which decreases by discharging said gas through the ports 8.

It is clear from a study of FIG. 1 that the rotating liquid has a tendency to escape into the zone which is delimited by the triangle A, B, C with curvilinear sides before each suction port 7 is uncovered at 14 by the root or heel of a vane 5a of the rotor 5.

The disadvantage of this process is that the liquid which has not entirely escaped from the rotor compartment is thus suddenly released as soon as the suction port 7 is uncovered, and this sudden liberation of the liquid which is additionally amplified as a result of the divergence A of the surface of the impeller chamber produces an impact of the liquid droplets against the metal of the above-mentioned pump casing and rotor which in turn produces considerable erosion of these elements. Such hydraulic shocks are very distinctly perceptible and are known as "shotting."

Similar drawbacks, although of a less serious nature, can be observed at the discharge end. In fact, at the "closing" point D (beginning of the centered cylindrical zone of the surface of the impeller chamber), the sudden change in direction between each lobe and the centered cylindrical portion also produces shocks and overpressures which are detrimental to the performance of the machine.

As is shown by way of example in FIG. 2, the disadvantage referred-to above is circumvented by virtue of an arrangement wherein the eccentric lobes 2a of the impeller chamber are joined to the portions of cylindrical surface C1–D1 of said impeller chamber along tangent planes C1–A1 and D1–E1 which start at the opening points C1 and closing points D1 of the lobes respectively.

Under these conditions, the suction ports 20 are uncovered by the root or heel of each vane 5a at the very moment when (taking into account the fact that the rotor 5 turns in the direction of the arrow F) the tip of each vane uncovers the initial portion C1 of the lobe 2a; on the discharge side, the closing of the ports 21 by the root or heel of each vane 5a coincides with the very moment when the tip of each vane masks the end of the lobe at the point D1.

Figure 4:
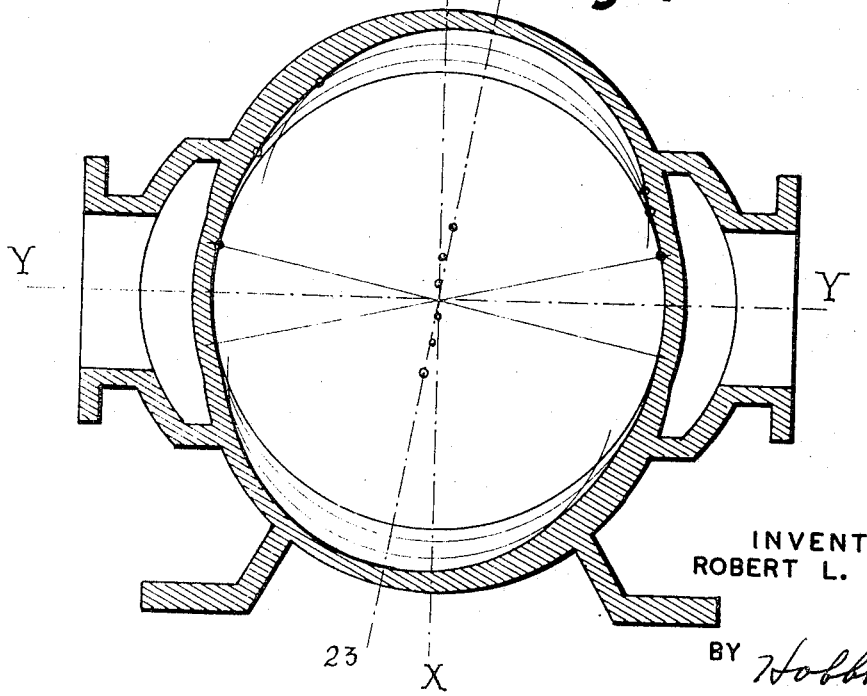
FIG. 4 is a view in cross-section which is similar to the preceding and which shows a pump stator of even more highly improved design than that of FIG. 3.

In order to extend the time of discharge which would become too short if the lobes 2a were spaced symmetrically (as is the case in pumps at the present in use) with respect to the diametral plane X—X (at right angles to the dimetral plane Y—Y), these lobes are arranged symmetrically with respect to a diametral plane 22–23 which is inclined at an angle of approximately 5 to 15° with respect to the plane X—X as can be seen from FIGS. 2, 3 and 4. With the same object in view, the internal radii R1 and R2 of said lobes are unequal in order to be joined tangentially, not only to each other in the plane 22–23 but also to the surfaces C1–A1 in the case of the radius R1 and the surfaces E1–D1 in the case of the radius R2.

The above design achieves a substantial economy of driving power and ensures a much longer service life of the pump components. It does nevertheless require special reproducing tooling for the rational execution of the internal wall of the impeller chamber of the pump casing 1.

It is possible to a certain extent to dispense with such special tooling and to carry out the machining by means of conventional equipment in order to come as closely as possible to the preferential shape of impeller chamber which is shown in FIG. 2.

FIG. 3 represents a pump casing in which the impeller chamber can be constructed with the aid of ordinary tooling equipment. In a machining operation of this kind, each lobe is formed in several passes, namely a first lathe-turning pass along the circumference 26 having a center 27 and a second pass along the circumference 28 having a center 29, the center 29 being located in the diametral plane 22–23 which is inclined at an angle of 5 to 15° with respect to the diametral plane X—X. This machining operation substantially reduces the angles which are located at the points of junction of the lobes with the centered cylindrical portions of the impeller chamber and at the same time elongates the zone of discharge of the liquid ring.

Instead of providing two lathe-turning passes for each lobe as in the case of FIG. 3, it is possible to provide a larger number, for example three passes as has been indicated in FIG. 4 and by virtue of which the preferential shape of FIG. 2 is more closely followed.

In another order of ideas, it is known that the fixing lugs or brackets employed for the purpose of mounting pumps of the type considered on a support such as floor, base-plate and the like and, similarly, the lugs which serve to secure the pump-driving motor (when this motor is mounted directly on the pump casing, for example on the top of this latter) are cast in one piece with the pump casing. As a consequence, the masses of metal in the casting mold are increased at the points of junction between the lugs and pump casing and the casting and machining times are similarly increased. Furthermore, the said masses of metal often result in shrinkage cavities which are highly detrimental to the performance of the pump.

The possibility of overcoming this disadvantage is shown in FIGS. 5 to 12.

In FIGS. 5 and 6, the reference 30 serves to designate a pump casing which is closed by two end-plates 31. The flanges 31a of the end-plates 31 are provided at 32, 33, 34 and 35 with recessed portions in order that added supporting lugs such as the lugs 36 and 37 (shown in FIGS. 7, 9 and 10) and the lug 38 (shown in FIGS. 8, 11 and 12) can thus be fixed on the faces of the pump casing which are left exposed for this purpose and dispose in radial planes.

The mounting brackets or lugs of the motor have been designated by the references 36' and 37' and shown in chain-dotted lines in FIG. 6 in their normal position on the pump; in addition, the pump supporting lugs 38 have been designated by the reference 38' and shown in chain-dotted lines in their normal and final position.

In view of the fact that the cradle elements and pairs of lugs 36 and 37 are inclined with respect to the radial plane Y—Y of the pump, the driving motor 40 can be mounted in a favorable position which makes it possible by means of a tension-screw 39 to adjust the distance between the axis of the pump and the axis of the motor so as to regulate the tension of the driving belts. In addition, the axial displacement of the lugs 36 and 37 brings the motor closer to the driven end of the pump shaft.

This method of assembly of the lugs on the pump thus makes it possible not only to eliminate accumulations of metal at certain points of the pump casing but also to reduce machining costs inasmuch as the exposed faces on which the above-mentioned lugs are brought to bear can be machined at the same time as the faces to which the end-plates are joined. Moreover, a further economy is achieved especially when the pump stator has to be formed of a costly metal such as stainless steel, in view of the fact that the added lugs can be formed of a metal which is not costly.

It is known that, in pumps of conventional design, the rotor, which has been designated by the reference 41 in FIGS. 13, 14 and 15, usually comprises two vane rings 42 and 43 which are placed side by side and held in position by cheeks 44 and 45 and by a central disc 46 which is centered on a hub 47.

Each vane of the ring 42 is disposed in the line of extension of a corresponding vane of the contiguous ring 43, with the result that, at the moment of solidification within the mold of the molten metal which is intended to form the rotor, the shrinkage of the metal which constitutes the vanes is opposed by the resistance of the cores employed for molding the vanes and cannot take place completely. In consequence, internal stresses are permitted to remain within said vanes and give rise to the formation of cracks in the solidified metal. Said cracks appear either immediately or when a relatively long period of time has elapsed after the rotor has been put into service, in spite of the reinforcements 49 which are formed at the roots of the vanes (as shown in FIG. 15).

In order to obviate this disadvantage, the rotor is designed according to the invention in the manner which has been shown in FIGS. 16 to 18, wherein the vanes of the two rings 50 and 51 of the modified rotor 48 are not in the line of extension of each other but displaced angularly, for example by one half-pitch as is apparent from FIGS. 16 and 18. This feature does not preclude the possibility of retaining the reinforcements 52 (which correspond to the reinforcements 49 described above) for the purpose of increasing the strength and consequently the reliability of the rotor.

The angle of displacement between the vanes which form part of different rings is advantageously equal to the pitch of the vanes divided by the number of rings of vanes.

By means of this improvement, the external cheeks 53 and 54 of the rotor are the first to solidify at the time of progressive cooling of the rough part within the mold; the vanes 50 and 51 then solidify, whilst the central disc 55 is still in the liquid or plastic state.

The result of this improvement is that the vanes are able to shrink normally while deforming only to an imperceptible degree the central disc 55 which is still in the liquid or plastic state. In fact, in each zone of junction between a vane and the central disc, said disc is not restrained by a contiguous vane, as is the case with known constructional designs.

The direct consequence of the foregoing is that the novel arrangement of the vane rings supplies a radical remedy to the formation of cracks as mentioned above.

Another effect of this arrangement which is by no means negligible is the appreciable reduction in the perceptible noise produced by the delivery of the pump; in fact, while it is true that there are twice the number of pulsations of vanes within the pump, the strength of each pulsation is reduced by half with respect to the previous design and, although the number of pulsations is double, the noise amplitude is reduced by half and produces the effect of a more continuous noise, which is less tiring.

It is apparent that the examples of practical application of the improvements which have been described above and illustrated in the accompanying drawings are given solely by way of indication and not in any limiting sense and that any detail modification could be made therein without consequently departing from the spirit of this invention.

What I claim is:

1. In a liquid ring pump of the class of gas pumps and compressors, having a pump casing comprising a main casing and end-plates provided with flanges for the purpose of securing said end-plates to the lateral faces of the main casing and separate lugs fixed to said pump casing and belonging to the class of mounting brackets for fixing the machine on a support and for mounting a motor on said machine, the fact that said flanges comprise recessed portions in the place occupied by the said lugs which are fixed to said lateral faces of the main casing.

2. Liquid-ring machine as claimed in claim 1, wherein the lugs each have a fixing face which is designed to be located in the plane of junction between main casing and end-plate.

3. In a liquid-ring machine of the class of gas pumps and compressors, comprising a stator and a rotor which is rotatably mounted within said stator and provided with vanes arranged in at least two parallel rings placed side by side and held in position by cheeks and by a central disc centered on a hub with which it forms one piece, the fact that the vanes of one of the rings are angularly displaced with respect to the vanes of the other ring.

4. Liquid-ring machine as claimed in claim 3, wherein the angle of displacement between the vanes which form part of different rings is equal to the pitch of the vanes divided by the number of rings of vanes.

References Cited by the Examiner

UNITED STATES PATENTS

| 272,595 | 2/1883 | Smith | 230—128 |
| 2,631,021 | 3/1953 | Arnold. | |
| 2,798,660 | 7/1957 | Flynn | 230—128 X |
| 3,006,533 | 10/1961 | Adams | 230—79 |

FOREIGN PATENTS 435,368  10/1926  Germany.

ROBERT M. WALKER, *Primary Examiner.*